United States Patent
Schwartz et al.

(10) Patent No.: US 11,263,482 B2
(45) Date of Patent: Mar. 1, 2022

(54) AI IMAGE RECOGNITION TRAINING TOOL SETS

(71) Applicant: Florida Power & Light Company, Juno Beach, FL (US)

(72) Inventors: Eric D. Schwartz, Palm Beach Gardens, FL (US); Yinuo Du, Palm Beach Gardens, FL (US); Aaron J. Epel, Stuart, FL (US); Daniel J. Barbosa, Palm Beach Gardens, FL (US); Melanie A. Deangelis, Palm Beach Gardens, FL (US); Griffin M. Bracci, Tequesta, FL (US)

(73) Assignee: Florida Power & Light Company, Juno Beach, FL (US)

( * ) Notice: Subject to any disclaimer, the term of this patent is extended or adjusted under 35 U.S.C. 154(b) by 76 days.

(21) Appl. No.: 16/537,363

(22) Filed: Aug. 9, 2019

(65) Prior Publication Data

US 2021/0042574 A1    Feb. 11, 2021

(51) Int. Cl.
*G06K 9/62* (2006.01)
*G06N 20/00* (2019.01)

(52) U.S. Cl.
CPC ......... *G06K 9/6256* (2013.01); *G06K 9/6253* (2013.01); *G06N 20/00* (2019.01)

(58) Field of Classification Search
CPC ..... G06K 9/6256; G06K 9/6253; G06N 20/00
See application file for complete search history.

(56) References Cited

U.S. PATENT DOCUMENTS 7,194,134 B2   3/2007   Bradshaw
7,657,100 B2   2/2010   Gokturk et al.
(Continued)

FOREIGN PATENT DOCUMENTS

CN    104899628   *   9/2015   .......... G06K 7/1413
EP    2402867         8/2018
(Continued)

OTHER PUBLICATIONS

Z. Akata, F. Perronnin, Z. Harchaoui and C. Schmid, "Label-Embedding for Image Classification," in IEEE Transactions on Pattern Analysis and Machine Intelligence, vol. 38, No. 7, pp. 1425-1438, Jul. 1, 2016. 2015.
(Continued)

*Primary Examiner* — Amara Abdi
(74) *Attorney, Agent, or Firm* — Fleit Intellectual Property Law; Jeffrey N. Giunta (57) ABSTRACT

Systems and methods to label images for inclusion into a machine learning image recognition training data set. A coded labeling definition is defined. A set of digital images is collected that includes images of different types of piece of equipment. A digital image is presented that includes an image of a particular piece of equipment. A received numeric code corresponding to the particular piece of equipment within the present image is received. The received numeric code is associated with the present image and the present image is stored in association with the received numeric code into a machine learning image recognition data set. A machine learning image recognition is trained based on the machine learning image recognition data set to automatically associate unlabeled images with the respective numeric code that corresponds to the particular piece of equipment in the unlabeled image.

17 Claims, 7 Drawing Sheets

(56) References Cited

U.S. PATENT DOCUMENTS

| | | |
|---|---|---|
| 8,175,376 B2 | 5/2012 | Marchesotti et al. |
| 8,909,563 B1 | 12/2014 | Jing et al. |
| 9,183,226 B2 | 11/2015 | Yee et al. |
| 9,230,194 B2 | 1/2016 | Rabinovich et al. |
| 9,251,437 B2 | 2/2016 | Krizhevsky et al. |
| 9,594,983 B2 | 3/2017 | Alattar et al. |
| 9,792,530 B1 | 10/2017 | Wu et al. |
| 9,852,363 B1 | 12/2017 | Shlens et al. |
| 10,002,290 B2 | 6/2018 | Yokono |
| 10,140,553 B1 | 11/2018 | Vasisht et al. |
| 10,210,178 B2 | 2/2019 | Souche et al. |
| 10,210,432 B2 | 2/2019 | Pisoni |
| 2005/0135667 A1 | 6/2005 | Saarela et al. |
| 2011/0173037 A1 | 7/2011 | Attenberg et al. |
| 2012/0310715 A1* | 12/2012 | Singhal .............. G06Q 30/0267 705/14.1 |
| 2015/0215446 A1* | 7/2015 | Fujimoto .......... H04M 1/72469 455/566 |
| 2017/0011077 A1 | 1/2017 | Kypreos et al. |
| 2018/0181843 A1 | 6/2018 | Brown et al. |
| 2018/0268244 A1 | 9/2018 | Moazzami et al. |
| 2018/0322366 A1* | 11/2018 | Lim ..................... G06K 9/6255 |
| 2019/0043210 A1* | 2/2019 | Chui .................. G06K 9/00201 |
| 2019/0073538 A1 | 3/2019 | Ashani |
| 2020/0109029 A1* | 4/2020 | Pahlke ................. H04W 4/029 |
| 2021/0012296 A1* | 1/2021 | Blevins ............. G05B 23/0283 |

FOREIGN PATENT DOCUMENTS

| | | |
|---|---|---|
| WO | 2017134519 | 9/2017 |
| WO | 2018013982 | 1/2018 |
| WO | 2018158584 | 9/2018 |

OTHER PUBLICATIONS

W. Chong, D. Blei and F. Li, "Simultaneous image classification and annotation," 2009 IEEE Conference on Computer Vision and Pattern Recognition, Miami, FL, 2009, pp. 1903-1910. 2009.

Singh, Mohan & Curran, Eoin. (2009). Active Learning for Multi-label Image Annotation. ICAIC. 2009.

J. Wu, V. S. Sheng, J. Zhang, P. Zhao and Z. Cui, "Multi-label active learning for image classification," 2014 IEEE International Conference on Image Processing (ICIP), Paris, 2014, pp. 5227-5231. 2014.

Yu, Fisher & Zhang, Yinda & Song, Shuran & Seff, Ari & Xiao, Jianxiong. (2015). LSUN: Construction of a Large-scale Image Dataset using Deep Learning with Humans in the Loop. 2016.

M. Wigness, B. A. Draper and J. R. Beveridge, "Efficient label collection for unlabeled image datasets," 2015 IEEE Conference on Computer Vision and Pattern Recognition (CVPR), Boston, MA, 2015, pp. 4594-4602. 2015.

Aggarwal C.C., Zhai C. (2012) A Survey of Text Classification Algorithms In: Aggarwal C., Zhai C. (eds) Mining Text Data. Springer, Boston, MA 2012.

* cited by examiner

AI IMAGE RECOGNITION TRAINING TOOL SETS

FIELD OF THE DISCLOSURE

The present disclosure generally relates to creating data sets that are suitable for training automated image recognition processes, and more particularly to producing sets of image recognition training images that have consistent labels.

BACKGROUND

Automated systems that support and perform computer vision and image recognition, such as those that include artificial intelligence (AI), machine learning processing, can be provided with an image of an object of interest and identify the object that is in the image. Such processing is useful for automatically identifying or classifying the object or objects that are captured in each of a large number of images.

In some examples, automated artificial intelligence based image recognition processes are initially trained to recognize particular objects by providing training data sets to train the image recognition model. Such training data sets include a number of images of objects that are the machine learning system is to identify. Each of these images also has a label that identifies the object in the image and may also have the labeled object highlighted in some way to facilitate the machine learning algorithm in identifying the object.

In an example, the individual images in the training set are examined by a person and the objects of interest in the images are manually identified, labeled, and highlighted so that the computer algorithms can then review labeled images and build a pattern of recognition. Because of the large number of images for each type of object that has to be processed to adequately teach a machine learning image recognition processor, a number of individuals may be employed to examine the images and label each one. In cases where multiple people are labeling images of the same type of object, which ideally should be assigned the same label, different persons labeling the same type of object may use different phrases or names to label the same type of object. Providing images of the same type of object, which should all ideally have the same label, complicates the machine learning process because the process will learn two names for the same type of object. This will reduce image recognition accuracy and cause larger training sets to be required to obtain acceptable results.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below systems and methods include and provide processing and techniques that improve the efficiency of labeling images of objects that are to be used to train a machine learning image recognition process. These systems and methods are useful for increasing the assurance that the same label is assigned to different images of a particular type of object by facilitating entry of the same label for each of these different images even when a number of different people are reviewing and labeling these different images. These systems and methods further facilitate one or more people reviewing a number of images that contain different types of objects in providing consistent labeling of images that have the same particular type of object. In an example, these systems and methods are able to be used to create a training data set for a machine learning image recognition system. By increasing the assurance that images of the same particular type of object all have the same label, the efficiency of training a machine learning image recognition process is improved. Using these multiple images of that particular type of object that all have the same label as a training data set for a machine learning image recognition processing allows for more efficient training of that machine learning image recognition processing by using fewer images to better train the image recognition process to accurately recognize that particular type of object.

In an example, the below described systems and methods provide a facility for a person to highlight an object of interest in a displayed image and enter a defined label that uniquely describes the particular type of object captured in the displayed image. In an example, the label entered by the person reviewing the image is defined according to a code system that was created to allow easy classification of objects within the image.

In an example, the below described systems and methods are used by a system used to monitor equipment deployed by an electrical utility to train a machine learning image recognition system to identify images of pieces of equipment that are deployed in the field by that electrical utility. These systems and methods define a coded labeling definition that defines a respective numeric code that corresponds to each respective type of each piece of equipment that can be captured by images that are to be labeled. In an example, the coded labeling definition assigns a unique multiple-digit code to each broad type of equipment. In an example, each type of equipment is assigned a general category that is identified by a two-digit code, and subtypes in each of those general categories are in turn each assigned a two-digit subtype code.

In defining the code, each type of equipment is given a two-digit, high-level equipment code (sometimes referenced as an 'eq code'). From there, each type of equipment has an additional, two-digit subtype codes. In an example, the two-digit subtype codes denote differences in material, usages, or placement on poles or lines. In an example, the defined coded labeling definition defines coded labels for each type of pieces of equipment that are within a defined number of types of pieces of equipment. In an example, a first two-digit subtype code indicates a category of types of pieces of equipment, and the second two-digit subtype code indicates a subcategory of types of pieces of equipment in the respective first two-digit subtype code.

A catalog or other reference material is created as a reference catalog and provided to each person who reviews and labels the images that clearly identifies each type of equipment that is used by the utility. In an example, providing such a catalog or other reference material is an example of defining the coded labeling definition. This catalog or other reference material is organized by the general category and subtype and includes a photo of the type of equipment associated with each multiple-digit code. In an example, the catalog or other reference material includes, for each respective type of each piece of equipment within a defined number of types of pieces of equipment that are defined by the coded labeling definition, a respective presentation that includes: 1) at least one reference image of a respective type of a piece of equipment presented in the respective presentation; and 2) a respective numeric code within the coded labeling definition that corresponds to the particular type of the piece of equipment presented in the respective presentation. In further examples, such a catalog or other reference material is able to include any other information that is able to facilitate a user's labeling of images.

The coded labeling system is used by the person labeling each image, where a computer program operates a user interface that allows the user to draw a box around each component of interest (e.g., piece of equipment) in an image presented on the user interface and then the user is able to enter a numeric code that corresponds to the coded label that identifies the component of interest indicted in the presented image. In an example, a ceramic insulator with a particular design that is mounted on an electric power distribution pole would be given a coded label such as 01-01. Persons with a minimal amount of experience are easily able to determine numeric codes that correspond to the coded label that is to be applied to a particular type of equipment presented in an image, and streamlines the labeling process by eliminating both uncertainties in syntax, such as inconsistent use of capitals, abbreviations, hyphens, exact terminology, etc. The use of these code based labels further improves operator efficiencies by reducing the raw number of keystrokes used to label each component in the image. In an example, each piece of equipment is labeled with code that is entered with only five (5) keystrokes as opposed to the ten (10) to fifteen (15) keystrokes required to label with text.

The use of these simplified labeling conventions in the below described systems and methods, where each type of equipment is depicted in a catalog or other reference material provided to the person performing the labeling, allows efficient and accurate labeling by relatively inexperienced persons. In an example, such labeling is able to be accurately and consistently performed for a large number of images through crowdsourcing. In an example, a large group of persons are able to be offered the opportunity to review and label a few images of equipment in exchange for some benefit.

Figure 1:
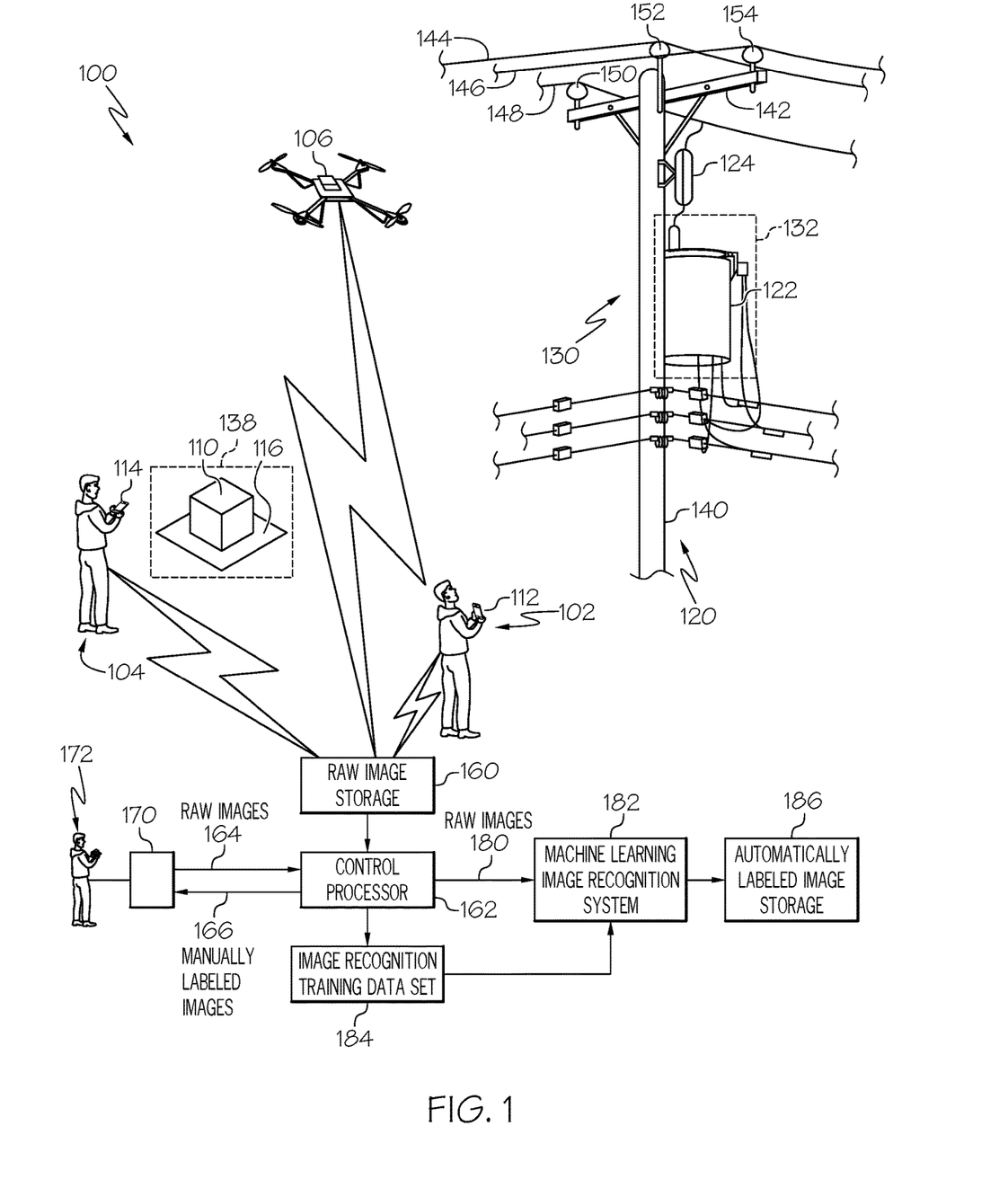
FIG. 1 illustrates an equipment image capture environment, according to an example.

FIG. 1 illustrates an equipment image capture environment 100, according to an example. The equipment image capture environment 100 depicts a small sample of equipment that is deployed by an electrical utility as part of its electrical distribution system. The equipment image capture environment 100 also depicts persons and other image collection assets that are used to capture images of this equipment.

The equipment image capture environment 100 includes an electric power line distribution pole and equipment 120 that includes a vertical pole 140 with various components 130 installed near the top of the vertical pole 140. A horizontal crossbeam 142 is mounted near the top of the vertical pole 140 to support three (3) electrical power lines, a first electrical power line 144, a second electrical power line 146, and a third electrical power line 148. The components 130 include an overcurrent protection device 124 and a transformer 122. Conductors connect one terminal of the overcurrent protection device 124 to the third electrical power line 148 and the other terminal of the overcurrent protection device 124 to an input of the transformer 122.

Each electrical power line is attached to the horizontal crossbeam 142 by a respective insulator. The first electrical power line 144 is attached to the horizontal crossbeam 142 by a first insulator 150, a second electrical power line 146 is attached to the horizontal crossbeam 142 by a second insulator 152, and a third electrical power line 148 is attached to the horizontal crossbeam 142 by a third insulator 154.

A first observer 102 captures one or more images with a first camera 112 that each contains one or more pieces of equipment within the components 130. For example, a first image 132 captures an image of transformer 122, a second image 134 captures the overcurrent protection device 124, and a third image 136 captures the horizontal crossbeam 142 and the three (3) insulators, the first insulator 150, the second insulator 152, and the third insulator 154.

FIG. 1 further illustrates a pad mounted transformer 110 that is mounted on a pad 116. A second observer 104 captures a fourth image 138 of the pad mounted transformer 110 with a second camera 114.

In various examples, images of various different pieces of equipment that are deployed by an electric utility are able to be captured by any suitable technique. As described above, observers are able to capture images by handheld cameras. In alternative examples, other image capture platforms are able to be used such as one or more cameras mounted on a drone 106, cameras mounted on various types of aircraft, on various types of ground vehicles, on other platform, or on combinations of these.

In an example, the images captured by the first camera 112 and the second camera 114, potentially other cameras or other image capture platforms, or combinations of these, are collected by being sent to a raw image storage 160. The images collected into the raw image storage 160 in an example are images that capture views of equipment that are able to be different types of piece of equipment within the defined number of types of pieces of equipment for which the defined coded labeling definition is defined.

A central processor 162 distributes images received by and stored in the raw image storage 160 for further processing. In an example, the images received by and stored in the raw image storage 160 are able to be sent to a device used by a person who can view the images and manually label each image to indicate pieces of equipment captured in that image. Such manually labeled images are able to be stored in an image recognition training data set 184 and used, for example, to train a machine learning image recognition system 182. Alternatively, received raw images that are stored in the raw image storage 160 in an example are able to be processed by that machine learning image recognition system 182 to be categorized and automatically labeled according to components captured in the images. In some examples, images that are to be manually labeled in order to create an image recognition training data set 184 are received or stored separately from images that are to be processed by the machine learning image recognition system 182.

In some examples, the machine learning image recognition system 182 is able to operate on a computer processor and utilize machine/computer learning to identify particular pieces of equipment that are captured in images collected by various sources and develop machine learning algorithms and models perform inferences with regards to which pieces of equipment are captured within a particular image. In some examples, such machine learning processing operates to identify which elements, such as quantities, values, observations, or other data, are able to serve as distinguishing characteristics of affects that are caused by different incidents, and evaluate these elements in order to determine useful indecent signatures that are able to support inference determinations in identifying pieces of equipment that are present in captured images. In an example, the machine learning algorithms/models are trained using one or more machine learning techniques. For example, in one embodiment, a deep learning artificial neural network (DLANN) model is trained to determine useful characteristics for inclusion into a definition of incident signatures and provide inferences of pieces of equipment that are captured in images being processed. In further examples, other machine learning models are applicable as well. In an example, the training of a machine learning image recognition process includes training the process to automatically associate unlabeled images including an image the particular type of the piece of equipment with the respective numeric code within the coded labeling definition that corresponds to the particular type of the piece of equipment.

A DLANN model is generally comprised of a plurality of connected units referred to as artificial neurons. Each unit is able to transmit a signal to another unit via a connection there between. A unit that receives a signal from another unit processes the signal and may transmit its own signal to another unit based on the processed signal. A unit may be associated with a state (e.g., $0 \leq x \leq 1$) where both a unit and a connection may be associated with a weight that affects the strength of the signal transmitted to another unit. The weight may vary during the learning process of the model. The model may comprise multiple layers of connected units, where different layers perform different transformations on their inputs. The first layer acts as the initial input (e.g., from the inputted data) to the model, where signals from this layer propagate to the final layer (e.g., identified solution). The initial layers of the model may detect specific characteristics of the target solution while inner layers may detect more abstract characteristics based on the output of the initial layers. The final layers may then perform more a complex detection based on the output inner layers to detect the target solution.

The DLANN model utilized by the machine learning image recognition system 182 in an example is trained by providing training data to the model as an input, such as the image recognition training data set 184 that has been created as described above. The model may be trained on a processor implementing the machine learning image recognition system 182 and/or at an external information processing system.

The central processor 162 in an example determines or selects raw images that are to be manually labeled by a person and used as part of an image recognition training data set 184. In an example, such raw images 164 are sent to an image labeling user interface device 170. The image labeling user interface device 170 presents each raw image to a person 172, who is able to enter one or more coded label(s) that correspond(s) to pieces of equipment captured in the image. The image labeling user interface device 170 in some examples allows the person 172 to enter an indication of a highlighted area of the image that contains the piece of equipment corresponding to the coded label entered by the person 172 for that image. In an example, an image labeling user interface device 170 includes a user interface with a display to present images to a person and that also has input facilities to allow that person to highlight a portion of the image, such as a portion that contains a piece of equipment, and to enter a label for the piece of equipment that is in that highlighted portion. In further examples, any suitable type of equipment is able to be used by a person 172 to add coded labels to images that capture pieces of equipment.

Once the images are labeled by the user with the image labeling user interface device 170, the labeled images, which may have highlighting to indicate the portion of interest in the image that contains the piece of equipment corresponding to the added coded label, are then stored in a image recognition training set 184. This image recognition training set 184 is then used to train the machine learning image recognition system 182 according to any presently know techniques or techniques that may be developed in the future.

The central processor 162 in an example is able to operate to either: accumulate received images to be used to train the machine learning image recognition system 182; or to cause selected received images stored in the raw image storage 160 to be processed by the machine learning image recognition system 182 to automatically classify and label those selected received images based on previous training. When operating to cause images to be processed by the machine learning image recognition system 182, the central processor 162 is able to provide received images, either directly after receipt or after storing the images into the raw image storage 160, to the machine learning image recognition system 182. The machine learning image recognition system 182 in turn processes those images and automatically labels each image prior to storing the automatically labeled images into the automatically labeled images 186. In an example, the machine learning image recognition system 182 identifies the type of component contained in the received image and labels that image according to the identified component in the received image.

Figure 2:
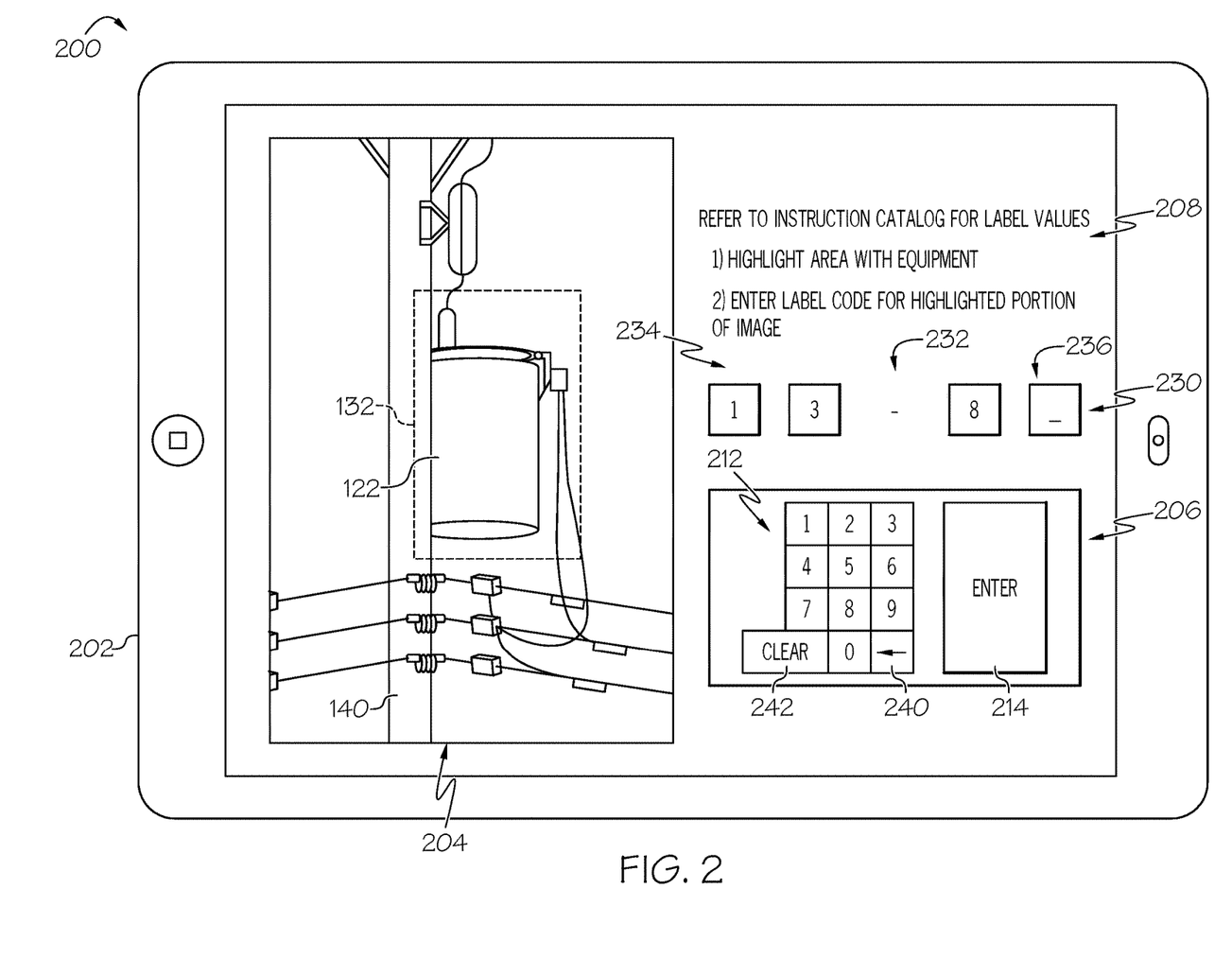
FIG. 2 illustrates a user interface device, according to an example.

FIG. 2 illustrates a user interface device 200, according to an example. The user interface device 200 is an example of the above discussed image labeling user interface device 170. The illustrated user interface device 200 includes facilities to present images and other user interface elements on a touch sensitive display screen 202. The user interface device 200 is an example of a device that presents an image to a user, allows the user to view and inspect the presented image, highlight an area of interest in the presented image, and enter a coded label for the image. In an example, the user interface device 200 is used to present uncategorized or unlabeled images and allows a user to enter a coded label for a portion of that that image that the user may be able to highlight in order to allow that labeled image to be used as part of a training data set for a machine learning image recognition system. The description of the user interface device 200 refers to the above description of the equipment image capture environment 100.

The user interface device 200 includes a touch screen display 202 that presents images and allows a user to provide inputs by touching various user interface elements presented on the touch screen display 202. In further examples, similar user interface devices are able to have other user input and output facilities such as physical buttons or other devices to allow a user to provide input, voice or gesture input facilities, other facilities, or combinations of these.

The touch screen display 202 includes an image display area 204 that presents an image to the user. In an example, images presented in the image display area 204 include raw images of pieces of equipment as are discussed above. The depicted image display area 204 is shown to contain the first image 132 that includes an image of a vertical pole 140 and a transformer 122. A highlighted region 222 is shown that is depicted as a dashed circle 220 around the portion of the depicted first image 132 that includes the transformer 122. In an example, this dashed circle 220 is able to added by a user of the user interface device 200 by any suitable technique. For example, the user may use his or her finger or a stylus to draw a circle within the image display area 204 of the touch screen display 202 to highlight that portion of the displayed image. In further examples, other user input facilities are able to be provided to allow a user to enter an indication of a highlighted region of the image display area 204.

The touch screen display 202 in this example includes an instruction area 208 that indicates to the user that a code should be entered that corresponds to the image presented in the image display area 204. The instruction area 208 also includes a reminder to the user to "refer to the instruction catalog for label values." In an example, users are provided with a catalog or other reference material that includes images of types of equipment that are to be labeled along with tips for identifying that equipment and the label that is to be given to images that include that particular type of equipment. In an example, each piece of equipment in the instruction catalog has the coded label value that is to be associated with images containing that piece of equipment.

The touch screen display 202 includes a keypad input 206. The keypad input includes a 3×4 key array 212 that has ten (10) numeric keys labeled 0-9 and also includes a backspace key 240 and a clear key 242. The keypad input 206 also has an enter key 214 that allows a user to end the input of label information.

The touch screen display 202 includes an entered label display area 230. The entered label display area 230 is an example of an input interface that receives a received numeric code within a coded labeling definition that corresponds to the particular type of the particular piece of equipment in the present image presented in the image display area 204. The entered label display area 230 displays label information entered by the user via the keypad input 206. The depicted example allows a coded label to be entered that consists of two sub-portions, or subcodes, that each has two (2) digits. The depicted entered label display area 230 includes a first input field 234 is shown as having received a first subcode input that includes the first sub-portion of the coded label has the digits "1" and "3" and a second input field 236 is shown has having received part of second subcode input, that includes the second sub-portion, which is the first digit "8," and is awaiting input for the second digit. The entered label display area 230, which is an example of an input interface, present a separator character 232, which is a dash "-" in this example, between the first input field 234 and the second input field 236. The illustrated coded label includes two subcodes that each have two digits. In further examples, the coded label is able to have any number of subcodes, and each subcode is able to have different number of digits where different subcodes have either the same number of digits, different number of digits, or combinations of these. In a further example, each subcode has three (3) digits.

Figure 3:
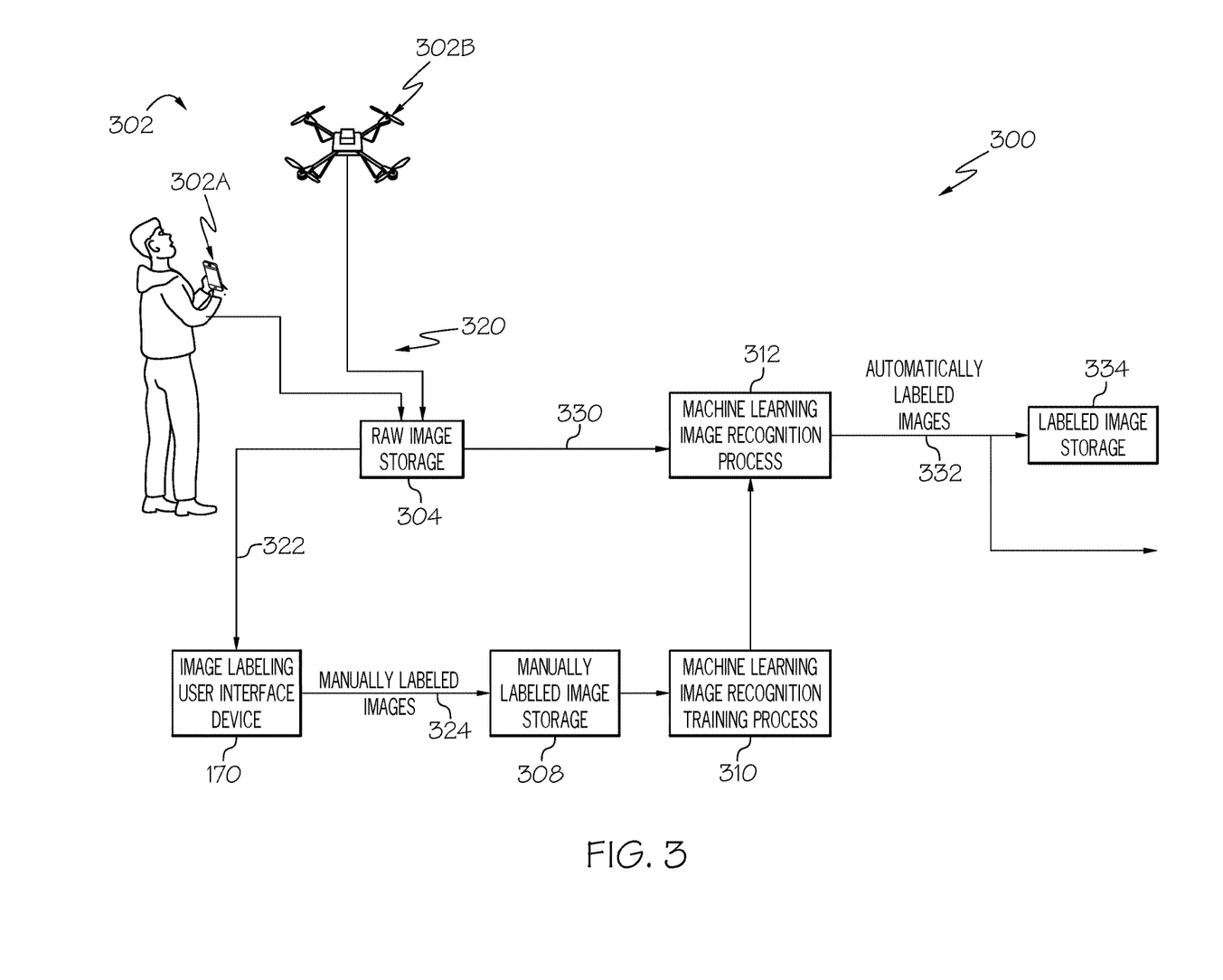
FIG. 3 illustrates an image labeling and processing data flow, according to an example.

FIG. 3 illustrates an image labeling and processing data flow 300, according to an example. The description of the image labeling and processing data flow 300 refers the above description of the equipment image capture environment 100. The image labeling and processing data flow 300 depicts processing of images of electrical distribution or transmission equipment. The image labeling and processing data flow 300 depicts processing that supports both processing new images with a machine learning based image recognition program to label equipment captured in those images, and also depicts processing to support creating labeled images to be used as part of a training data set to train a machine learning image recognition program to recognize images of such equipment. In an example, supporting the creation of labeled images includes providing unlabeled images to an image labeling user interface device 170 to allow a user to manually select areas of the image that contain a piece of equipment that is of interest, and to enter a label code that corresponds to that piece of equipment. In general, the image labeling and processing data flow 300 is able to be used to support processing to develop a training data set of manually labeled images to train one or more machine learning based image recognition systems for any application.

The image labeling and processing data flow 300 includes image collectors 302. The illustrated examples of image collectors 302 include a person with camera 302a and a drone with camera 302b. Raw images 320 are captured by any of the image collectors 302 and are communicated to a raw image storage 304. Images captured by the image collectors 302 are referred to as raw images because they are not labeled or otherwise categorized based upon a determination of equipment or other objects that are captured within those images. In general, images are able to be collected by any one or more suitable techniques and accumulated in any one or more repositories.

In one mode of operation, raw images 320 stored in the raw image storage 304 are able to be provided to a user operated image labeling user interface device 170. As described above, the user operated image labeling user interface device 170 in an example presents raw images to a user and allows the user to enter a coded label corresponding to an object captured in the image, and to also identify the area of interest in the image that contains that object. In further examples, any suitable device is able to be used to assist a person in providing a coded label that corresponds to a piece of equipment that is captured in an image being presented to the person labeling an image.

Once a raw image is labeled by a user via the user operated image labeling user interface device 170, manually labeled images 324 are provided to a manually labeled image storage 308. The manually labeled image storage 308 in an example stores one or more image recognition training sets that are used to train a machine learning image recognition processor. Each image stored in the in the labeled image storage 308 is an image that a person has reviewed and entered a label code that corresponds to a piece of equipment captured in that image. In various examples, the manually labeled images 324 are able to include images that have a highlighted area of interest that includes a piece of equipment captured in that image and also a label code that is associated with that piece of equipment. In some examples, the manually labeled images 324 are also able to include images without highlighted areas of interest as well as images that have any combinations of information associated with objects captured in the image as well as other data associated with the image.

The manually labeled images 324 that are stored in the manually labeled image storage 308 are provided to a machine learning image recognition training process 310. The machine learning image recognition training process 310 in an example is a machine learning image recognition processor that operates to train a machine learning image recognition process 312 based on a training set of data that contains a number of labeled images.

The image labeling and processing data flow 300 includes a machine learning image recognition process 312. The machine learning image recognition process 312 is able to receive raw, unlabeled or unclassified images, perform machine learning based image recognition processing on those images and produces automatically classified images 332. In an example, each automatically classified image in the automatically classified images 332 is an image that has been automatically assigned a label by the machine learning image recognition process 312. In various examples, the automatically classified images 332 are able to be stored in any suitable storage, such as the illustrated labeled image storage 334, provided to other processing components, provided to any suitable destination, or combinations of these.

Figure 4:
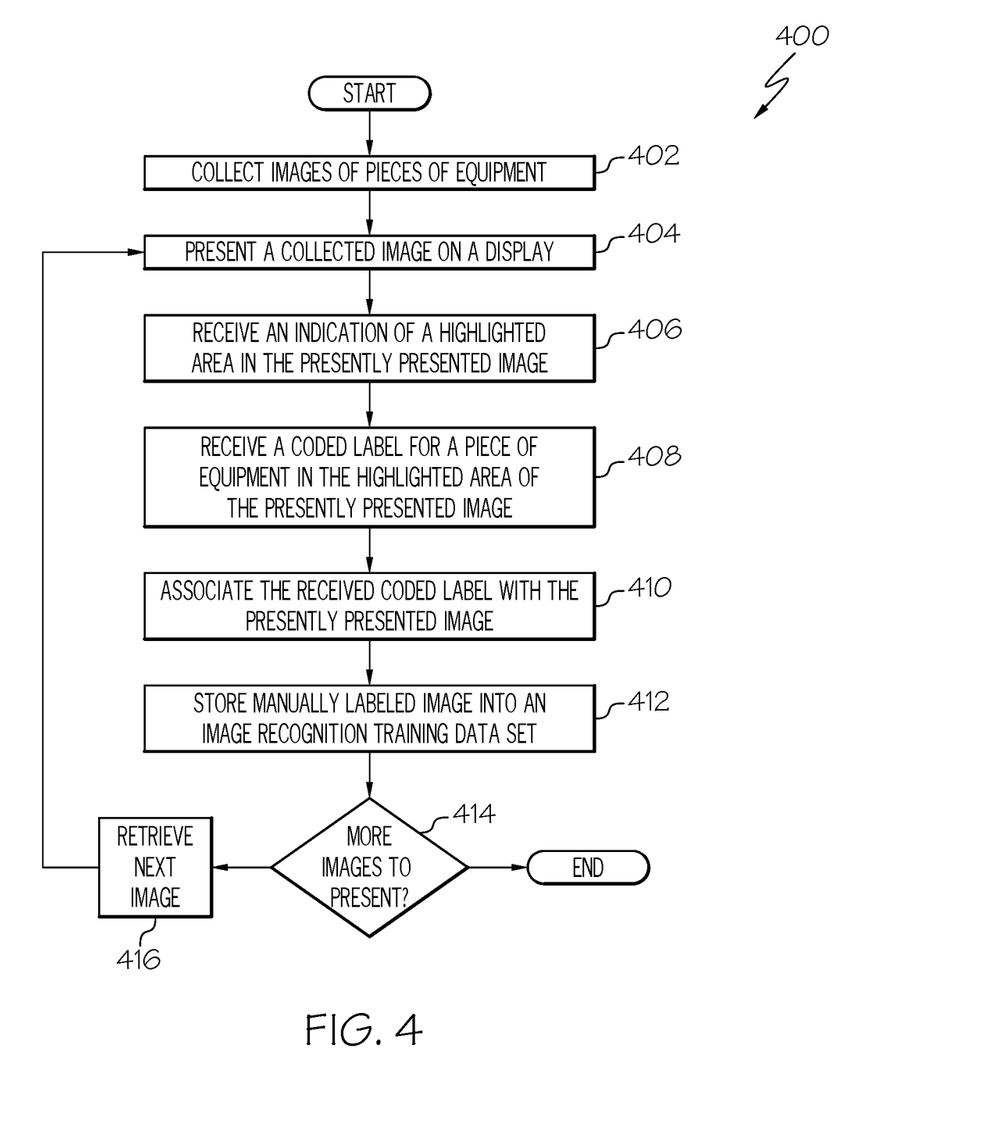
FIG. 4 illustrates a machine learning training set creation process, according to an example.

FIG. 4 illustrates a machine learning training set creation process 400, according to an example. The machine learning training set creation process 400 is an example of a process by which raw images are presented to a person and the person is able to enter coded labels to identify equipment captured in those images. The description of the machine learning training set creation process 400 refers to the image labeling and processing data flow 300 discussed above.

The machine learning training set creation process 400 begins by collecting, at 402, images of pieces of equipment. In various examples, the collected images are able to be images of pieces of equipment that are installed in the field, images of pieces of equipment that are placed in a studio setting or staged in various scenes, images of pieces of equipment in any environment, or combinations of these. In various examples, these images are able to be captured by any suitable technique, such as the above described image collectors 302. These collected images are also able to be stored in any suitable image or data storage architecture, such as being stored in one data storage collection, stored in any number of disparate data storage collections, or combinations of these. The raw image storage 304 is an example of a storage that is able to store the collected images.

The machine learning training set creation process 400 presents on a display to a person, at 404, a collected image. The presented image in an example is one of the images collected at 402. In an example, the images are presented on an image labeling user interface device 170 as is discussed above.

The machine learning training set creation process 400 in an example receives, at 406, an indication of a highlighted area that contains the piece of equipment that corresponds to the coded label that the person will enter to identify that piece of equipment. In an example, the image labeling user interface device 170 allows a person to draw an outline of a highlighted area, such as a square or rectangle, a circle or oval, any geometric shape, onto the presented image in order to identify the area of the image that contains the piece of equipment for which a coded label will be entered. In some examples, the person viewing the presented image does not indicate a highlighted area and the person viewing the image only provides a coded label for a piece of equipment that is captured in the image.

The machine learning training set creation process 400 receives, at 408, a coded label from a user viewing the presented image. In some examples, the coded label conforms to a numeric code, such as is described above with regards to the user interface device 200, and the coded label is entered into the image labeling user interface device 170 in a directed field, such as the entered label display area 230 that restrains the input to four (4) digits that consists of two (2) groups of two (2) digits each.

The received coded label is associated, at 410, with the presently presented image. Such an association is an example of associating, based on presenting the presently presented image and receiving a received numeric code, the received numeric code with the present image.

The manually labeled images are stored, at 412, into an image recognition training data set. Such storing is an example of storing the present image in association with the received numeric code into a machine learning image recognition data set. An example of storing the manually labeled images into an image recognition training data set is described above with regards to storing manually labeled images 324 into the manually labeled image storage 308.

The machine learning training set creation process 400 determines, at 414, whether there are more images to present to this person. In an example, this determination is able to be based on an input received from the person that the person does or does not want to view more images. In another example, the determination is based on whether or not there are more images to present to the person. In yet further examples, this determination is able to be based on other factors, or combinations of these factors.

If it is determined, at 414, that there are more images to present to the person, the machine learning training set creation process 400 retrieves, at 416, the next image to present, and returns to presenting images, at 404, as is discussed above. The machine learning training set creation process 400 then continues with the above described subsequent processing.

Returning to the determination, at 414, if it is determined that there are not more images to present to the person, the machine learning training set creation process 400 ends.

Figure 5:
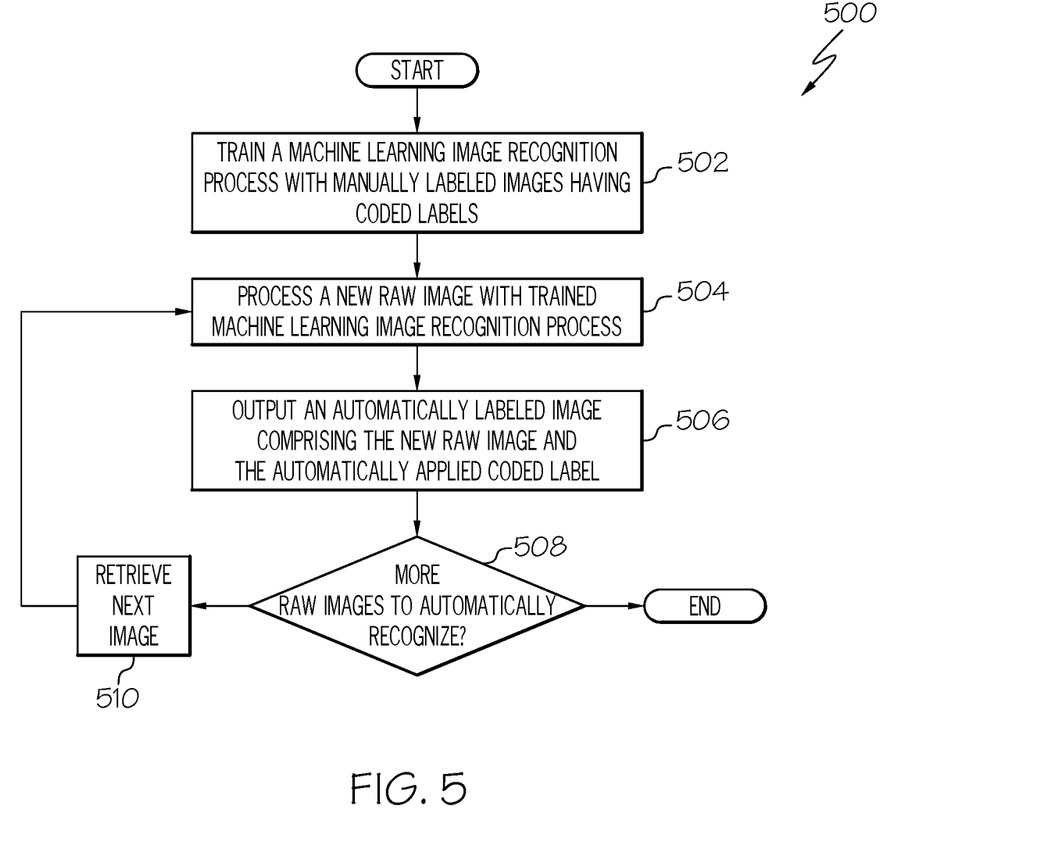
FIG. 5 illustrates a machine learning image recognition system training and operations process, according to an example.

FIG. 5 illustrates a machine learning image recognition system training and operations process 500, according to an example. This description of the machine learning image recognition system training and operations process 500 refers to the image labeling and processing data flow 300 discussed above. In an example, the machine learning image recognition system training and operations process 500 supports the operation of the machine learning image recognition training process 310 in training the machine learning image recognition process 312.

The machine learning image recognition system training and operations process 500 begins by training, at 502, a machine learning image recognition process. An example of training a machine learning image recognition process is the operation of the above described machine learning image recognition training process 310 in training the machine learning image recognition process 312. In an example, training the machine learning image recognition process includes training to automatically associate unlabeled images comprising an image the particular type of the piece of equipment with the respective numeric code within the coded labeling definition that corresponds to the particular type of the piece of equipment.

After training the machine learning image recognition process 312, the machine learning image recognition system training and operations process 500 processes, at 504, new raw images. In general, the machine learning image recognition process 312 is able to be trained and maintained by any suitable technique in order to properly process raw images. In an example, the processing includes automatically determining at least one label for each raw image. Each of the at least one label in an example is a code that identifies a particular piece of equipment that is captured in that image.

The machine learning image recognition system training and operations process 500 outputs, at 506, the automatically labeled image. An example of producing a labeled image is producing the automatically classified images 332 as is described above. The automatically labeled image in an example includes the raw image and an automatically applied coded label.

The machine learning image recognition system training and operations process 500 determines, at 508, whether there are more raw images to process. If it is determined that there are more raw images to process, the machine learning image recognition system training and operations process 500 retrieves, at 510, the next image to process and returns to processing, at 504, the new raw images and the subsequent processing described above. If it is determined that there are no more raw images to process, the machine learning image recognition system training and operations process 500 ends.

Figure 6:
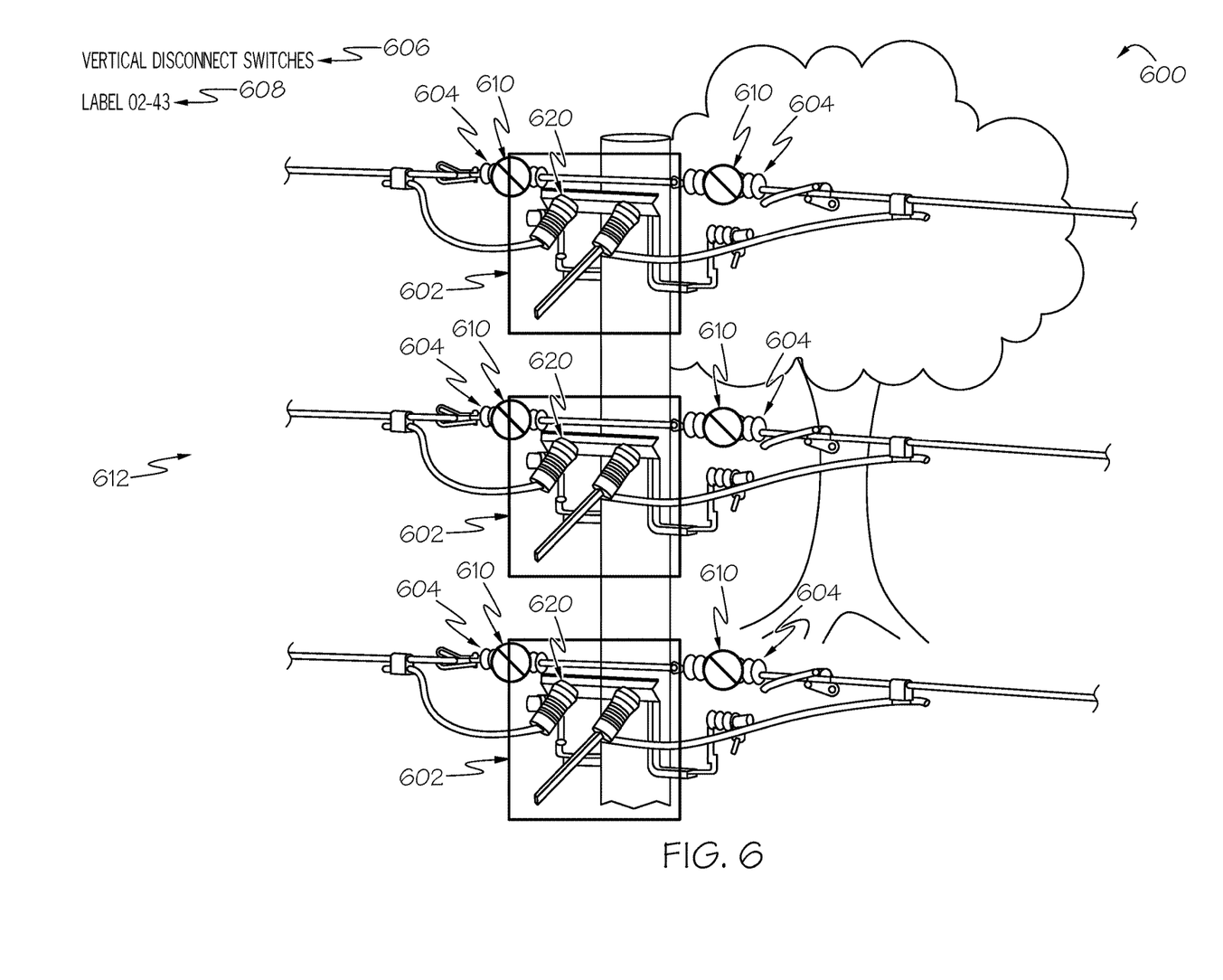
FIG. 6 illustrates an example image labeling instruction graphic, according to an example.

FIG. 6 illustrates an example image labeling instruction graphic 600, according to an example. In an example, people who are going to label raw images in order to create training image data sets are given image labeling instruction graphics to assist in properly identifying pieces of equipment in raw images and adding the proper coded label to images that capture a view of that piece of equipment. In some examples, a catalog is created that contains an image labeling instruction graphic for each type of pieces of equipment that a person will view images of and identify the piece of equipment in those images. This catalog is given to or made available to such persons. In an example, image labeling instruction graphics are able to be electronically stored and communicated, and a user of an image labeling user interface device 170 is able to select viewing various image labeling instruction graphics.

The example image labeling instruction graphic 600 includes an image 612 that captures a number of pieces of equipment. In the illustrated example, the example image labeling instruction graphic 600 indicates three (3) areas of the image 612 that each has a vertical disconnect component 620. These areas are indicated by three (3) boxes 602, with one box 602 around each vertical disconnect component 620 captured in the image 612.

The example image labeling instruction graphic 600 includes an instruction 606 that states the name of the piece of equipment in the image 612 and also provides the coded label 608 that corresponds to the particular piece of equipment that is highlighted in the image 612. In this example, the coded label is 02-43, which can be entered via the above described keypad input 206 on the user interface device 200.

The image 612 also indicates pieces of equipment that are not to be included in highlighted areas near the piece of equipment that is to be labeled with the coded label associated with this example image labeling instruction graphic 600. The other pieces of equipment 610 in this example are indicated with a cross out 604.

The example image labeling instruction graphic 600 is useful in assisting a person to correctly highlight and label a particular piece of equipment that is captured in a raw image. The example image labeling instruction graphic 600, including the boxes 602, that are presented in this example are similar to an image presented to that person that contains this particular piece of equipment, shows how such a piece of equipment should be highlighted with a box 602, and indicates other pieces of equipment 604 that may be near this particular piece of equipment but that should not be included in a highlighted area for this particular piece of equipment.

Figure 7:
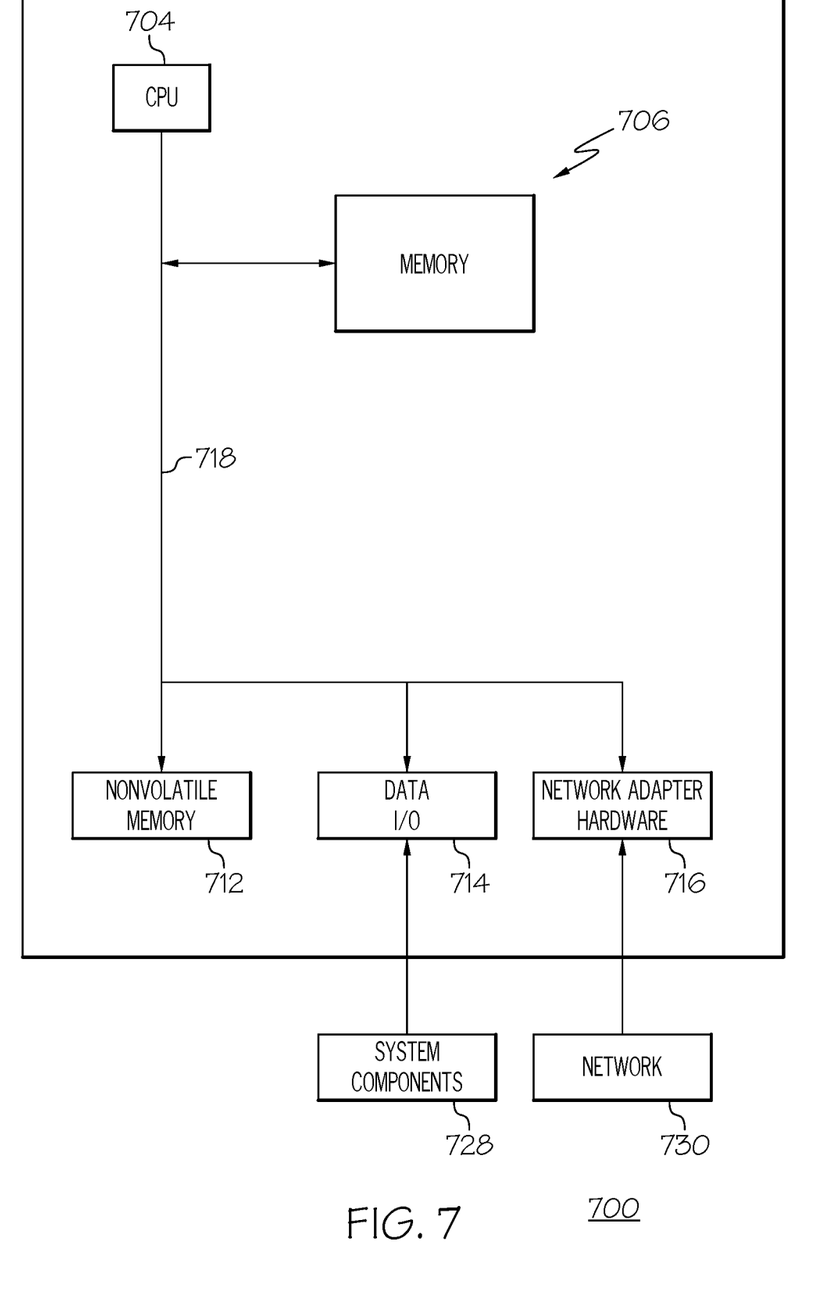
FIG. 7 illustrates a block diagram illustrating a processor, according to an example.

FIG. 7 illustrates a block diagram illustrating a processor 700 according to an example. The processor 700 is an example of a processing subsystem that is able to perform any of the above described processing operations, control operations, other operations, or combinations of these.

The processor 700 in this example includes a CPU 704 that is communicatively connected to a main memory 706 (e.g., volatile memory), a non-volatile memory 712 to support processing operations. The CPU is further communicatively coupled to a network adapter hardware 716 to support input and output communications with external computing systems such as through the illustrated network 730.

The processor 700 further includes a data input/output (I/O) processor 714 that is able to be adapted to communicate with any type of equipment, such as the illustrated system components 728. The data input/output (I/O) processor in various examples is able to be configured to support any type of data communications connections including present day analog and/or digital techniques or via a future communications mechanism. A system bus 718 interconnects these system components.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information. In general, the computer readable medium embodies a computer program product as a computer readable storage medium that embodies computer readable program code with instructions to control a machine to perform the above described methods and realize the above described systems.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for labeling images for inclusion into a machine learning image recognition training data set, the method comprising:
    defining a coded labeling definition for labeling images capturing views of equipment that are within a defined number of types of pieces of equipment, the coded labeling definition comprising a respective numeric code corresponding to each respective type of each piece of equipment within the defined number of types of pieces of equipment,
        wherein each respective numeric code comprises a respective first subcode and a respective second subcode, and
        wherein each respective numeric code comprises a separator character separating the respective first subcode and the respective second subcode;
    collecting a set of digital images comprising a plurality of images of different types of piece of equipment within the defined number of types of pieces of equipment;
    presenting, on a user interface device;
        a present image from within the set of digital images, the present image comprising an image of a particular piece of equipment wherein the particular piece of equipment corresponds to a particular type of a piece of equipment within the defined number of types of pieces of equipment; and
        an input interface comprising a first input field for receiving a first subcode input and a second input field for receiving a second subcode input, and further presents the separator character between the first input field and the second input field;
    receiving user input data via the user interface device, where the user input data is a specification by a user of a received numeric code within the coded labeling definition that corresponds to the particular type of the particular piece of equipment within the present image, wherein the received numeric code comprises the first subcode input corresponding to the respective first subcode and the second subcode input corresponding to the respective second subcode;
    associating, based on presenting the image and receiving the received numeric code, the received numeric code with the present image;
    storing the present image in association with the received numeric code into a machine learning image recognition data set; and
    training a machine learning image recognition process by processing, with a computer processor, the machine learning image recognition data set, wherein training the machine learning image recognition process comprises training to automatically associate unlabeled images comprising an image the particular type of the piece of equipment with the respective numeric code within the coded labeling definition that corresponds to the particular type of the piece of equipment.

2. The method of claim 1, further comprising:
providing, to a user of the user interface device, a reference catalog, the reference catalog comprising, for each respective type of each piece of equipment within the defined number of types of pieces of equipment, a respective presentation that comprises:
    at least one reference image of a respective type of a piece of equipment presented in the respective presentation; and
    a respective numeric code within the coded labeling definition that corresponds to the particular type of the piece of equipment presented in the respective presentation.

3. The method of claim 1, wherein the respective first subcode indicating a category of types of pieces of equipment, and the respective second subcode indicating a subcategory of types of pieces of equipment in the respective first subcode.

4. The method of claim 3, wherein each respective first subcode comprises a first number of digits, and wherein each respective second subcode comprises a second number of digits.

5. The method of claim 4, wherein each respective first subcode contains either two or three digits, and
    wherein each respective second subcode contains either two or three digits.

6. A system for labeling images for inclusion into a machine learning image recognition training data set, the system comprising:
- at least one processor;
- a memory communicatively coupled to the processor;
- a user interface;
- the at least one processor, when operating, being configured to:
- maintain a definition of a coded labeling definition for labeling images capturing views of equipment that are within a defined number of types of pieces of equipment, the coded labeling definition comprising a respective numeric code corresponding to each respective type of each piece of equipment within the defined number of types of pieces of equipment,
  - wherein each respective numeric code comprises a respective first subcode and a respective second subcode, and
  - wherein each respective numeric code comprises a separator character separating the respective first subcode and the respective second subcode;
- store a set of digital images comprising a plurality of images of different types of piece of equipment within the defined number of types of pieces of equipment;
- present, on the user interfaced;
  - a present image from within the set of digital images, the present image comprising an image of a particular piece of equipment wherein the particular piece of equipment corresponds to a particular type of a piece of equipment within the defined number of types of pieces of equipment; and
  - an input interface comprising a first input field for receiving a first subcode input and a second input field for receiving a second subcode input, and further presents the separator character between the first input field and the second input field;
- receive user input data via the user interface, where the user input data is a specification by a user of a received numeric code within the coded labeling definition that corresponds to the particular type of the particular piece of equipment within the present image;
  - wherein the received numeric code comprises the first subcode input corresponding to the respective first subcode and the second subcode input corresponding to the respective second subcode;
- associate, based on presentation of the image and receipt of the received numeric code, the received numeric code with the present image;
- store the present image in association with the received numeric code into a machine learning image recognition data set; and
- train a machine learning image recognition process by processing the machine learning image recognition data set, wherein training of the machine learning image recognition process comprises training to automatically associate unlabeled images comprising an image the particular type of the piece of equipment with the respective numeric code within the coded labeling definition that corresponds to the particular type of the piece of equipment.

7. The system of claim 6, wherein the at least one processor is further configured to:
- provide, to the user interface, a reference catalog, the reference catalog comprising, for each respective type of each piece of equipment within the defined number of types of pieces of equipment, a respective presentation that comprises:
  - at least one reference image of a respective type of a piece of equipment presented in the respective presentation; and
  - a respective numeric code within the coded labeling definition that corresponds to the particular type of the piece of equipment presented in the respective presentation.

8. The system of claim 6, wherein the respective first subcode indicating a category of types of pieces of equipment, and the respective second subcode indicating a subcategory of types of pieces of equipment in the respective first subcode.

9. The system of claim 8, wherein each respective first subcode comprises a first number of digits, and wherein each respective second subcode comprises a second number of digits.

10. A non-transitory computer readable medium storing a computer program product for labeling images for inclusion into a machine learning image recognition training data set, the computer program product comprising instructions that, when executed, cause a processor to:
- maintain a coded labeling definition for labeling images capturing views of equipment that are within a defined number of types of pieces of equipment, the coded labeling definition comprising a respective numeric code corresponding to each respective type of each piece of equipment within the defined number of types of pieces of equipment,
  - wherein each respective numeric code comprises a respective first subcode and a respective second subcode, and
  - wherein each respective numeric code comprises a separator character separating the respective first subcode and the respective second subcode;
- store a set of digital images comprising a plurality of images of different types of piece of equipment within the defined number of types of pieces of equipment;
- present, on a user interface device;
  - a present image from within the set of digital images, the present image comprising an image of a particular piece of equipment wherein the particular piece of equipment corresponds to a particular type of a piece of equipment within the defined number of types of pieces of equipment; and
  - an input interface comprising a first input field for receiving a first subcode input and a second input field for receiving a second subcode input, and further presents the separator character between the first input field and the second input field;
- receive user input data via the user interface device, where the user input data is a specification by a user of a received numeric code within the coded labeling definition that corresponds to the particular type of the particular piece of equipment within the present image;
- associate, based on presenting the image and receiving the received numeric code, the received numeric code with the present image,
  - wherein the received numeric code comprises the first subcode input corresponding to the respective first subcode and the second subcode input corresponding to the respective second subcode;
- store the present image in association with the received numeric code into a machine learning image recognition data set; and
- train a machine learning image recognition process by processing, with a computer processor, the machine learning image recognition data set, wherein training the machine learning image recognition process comprises training to automatically associate unlabeled images comprising an image the particular type of the piece of equipment with the respective numeric code within the coded labeling definition that corresponds to the particular type of the piece of equipment.

11. The non-transitory computer readable medium of claim 10, wherein the instructions, when executed, further cause the processor to:
provide to a user of the user interface device, a reference catalog, the reference catalog comprising, for each respective type of each piece of equipment within the defined number of types of pieces of equipment, a respective presentation that comprises:
at least one reference image of a respective type of a piece of equipment presented in the respective presentation; and
a respective numeric code within the coded labeling definition that corresponds to the particular type of the piece of equipment presented in the respective presentation.

12. The non-transitory computer readable medium of claim 10, wherein the respective first subcode indicating a category of types of pieces of equipment, and the respective second subcode indicating a subcategory of types of pieces of equipment in the respective first subcode.

13. The non-transitory computer readable medium of claim 12, wherein each respective first subcode comprises a first number of digits, and wherein each respective second subcode comprises a second number of digits.

14. A method for labeling images for inclusion into a machine learning image recognition training data set, the method comprising:
defining a coded labeling definition for labeling images capturing views of equipment that are within a defined number of types of pieces of equipment, the coded labeling definition comprising a respective first subcode indicating a category of types of pieces of equipment, and a respective second subcode indicating a subcategory of types of pieces of equipment in the respective first subcode;
presenting, on a user interface device:
a present image from within a set of digital images, the present image comprising an image of a particular piece of equipment wherein the particular piece of equipment corresponds to a particular type of a piece of equipment within the defined number of types of pieces of equipment; and
an input interface comprising a first input field for receiving a first subcode input and a second input field for receiving a second subcode input, and further presents a separator character between the first input field and the second input field
receiving, from the user interface device,
the first subcode input corresponding to the respective first subcode within the coded labeling definition that corresponds to a category of the particular type of the particular piece of equipment within the present image; and
the second subcode input corresponding to the respective second subcode within the coded labeling definition that corresponds to a subcategory of the particular type of the particular piece of equipment within the present image;
associating, based on presenting the image and receiving the first subcode input and the second subcode input, the first subcode input and the second subcode input with the present image;
storing the present image in association with the first subcode input and the second subcode input into a machine learning image recognition data set; and
training a machine learning image recognition process by processing, with a computer processor, the machine learning image recognition data set, wherein training the machine learning image recognition process comprises training to automatically associate unlabeled images comprising an image the particular type of the piece of equipment with the first subcode input and the second subcode input within the coded labeling definition that corresponds to the particular type of the piece of equipment.

15. The method of claim 14, wherein each respective first subcode comprises either two or three digits, and wherein each respective second subcode comprises either two or three digits.

16. The method of claim 1, wherein the user input data is received from a keypad that receives input from the user.

17. The method of claim 16, where the keypad comprises numeric keys and the user input data is received via the numeric keys.

* * * * *